US010384977B2

(12) United States Patent
Fuchsmann et al.

(10) Patent No.: US 10,384,977 B2
(45) Date of Patent: Aug. 20, 2019

(54) REINFORCED BUILDING BLOCK MADE OF AUTOCLAVED AERATED CONCRETE (AAC)

(71) Applicant: Evonik Degussa GmbH, Essen (DE)

(72) Inventors: Dirk Fuchsmann, Haltern am See (DE); Michael Vogel, Recklinghausen (DE); Vladislav Yaroslavskiy, Moscow (RU); Elena Mikhaylova, Dorf Puschkin-Gebirge (RU); Wladimir Richter, Recklinghausen (DE)

(73) Assignee: Evonik Degussa GmbH, Essen (DE)

( * ) Notice: Subject to any disclaimer, the term of this patent is extended or adjusted under 35 U.S.C. 154(b) by 0 days.

(21) Appl. No.: 15/618,200

(22) Filed: Jun. 9, 2017

(65) Prior Publication Data

US 2017/0369372 A1    Dec. 28, 2017

(30) Foreign Application Priority Data

Jun. 23, 2016 (EP) ..................... 16175866

(51) Int. Cl.

| | | |
|---|---|---|
| C04B 24/28 | (2006.01) | |
| C04B 14/42 | (2006.01) | |
| C04B 38/00 | (2006.01) | |
| C08G 59/24 | (2006.01) | |
| C08G 59/50 | (2006.01) | |
| C03C 25/1025 | (2018.01) | |
| C03C 25/36 | (2006.01) | |
| C04B 38/02 | (2006.01) | |
| C04B 20/10 | (2006.01) | |
| D06M 15/55 | (2006.01) | |
| E04C 5/07 | (2006.01) | |
| C08G 59/56 | (2006.01) | |
| C08L 63/00 | (2006.01) | |
| C04B 111/20 | (2006.01) | |
| C04B 111/76 | (2006.01) | |
| C04B 111/00 | (2006.01) | |
| C04B 111/28 | (2006.01) | |
| C04B 111/40 | (2006.01) | |
| C04B 111/52 | (2006.01) | |
| C04B 111/60 | (2006.01) | |

(52) U.S. Cl.
CPC .......... *C04B 24/281* (2013.01); *C03C 25/103* (2013.01); *C03C 25/36* (2013.01); *C04B 14/42* (2013.01); *C04B 20/1037* (2013.01); *C04B 38/00* (2013.01); *C04B 38/02* (2013.01); *C08G 59/245* (2013.01); *C08G 59/50* (2013.01); *C08G 59/502* (2013.01); *C08G 59/5026* (2013.01); *C08G 59/56* (2013.01); *C08L 63/00* (2013.01); *D06M 15/55* (2013.01); *E04C 5/07* (2013.01); *C04B 2111/00586* (2013.01); *C04B 2111/00603* (2013.01); *C04B 2111/2023* (2013.01); *C04B 2111/28* (2013.01); *C04B 2111/40* (2013.01); *C04B 2111/52* (2013.01); *C04B 2111/60* (2013.01); *C04B 2111/763* (2013.01); *Y02W 30/97* (2015.05)

(58) Field of Classification Search
CPC ... C04B 14/42; C04B 20/1037; C04B 24/281; C04B 38/00; C04B 38/02; C03C 25/103; C03C 25/36; E04C 5/07; E04C 5/073
See application file for complete search history.

(56) References Cited

U.S. PATENT DOCUMENTS

| | | |
|---|---|---|
| 3,030,247 A | 4/1962 | Schurb |
| 3,386,955 A | 6/1968 | Chrobok et al. |
| 3,677,978 A | 7/1972 | Dowbenko |
| 3,678,007 A | 7/1972 | Dowbenko |
| 4,283,520 A | 8/1981 | Moser et al. |
| 4,436,892 A | 3/1984 | Londler et al. |
| 4,529,821 A | 7/1985 | Stockinger et al. |
| 4,550,203 A | 10/1985 | Stockinger et al. |
| 4,587,311 A | 5/1986 | Schmid et al. |
| 4,618,712 A | 10/1986 | Stockinger et al. |
| 4,694,096 A | 9/1987 | Lehmann et al. |
| 4,859,761 A | 8/1989 | Flury et al. |
| 5,352,831 A | 10/1994 | Flury et al. |
| 5,424,373 A | 6/1995 | Flury et al. |
| 5,523,362 A | 6/1996 | Flury et al. |
| 6,613,861 B2 | 9/2003 | Gras |
| 6,908,980 B2 | 6/2005 | Gras |
| 6,916,897 B2 | 7/2005 | Gras |
| 9,676,898 B2 | 6/2017 | Ortelt et al. |
| 2007/0184281 A1 | 8/2007 | Setiabudi |
| 2011/0281117 A1 | 11/2011 | Ortelt et al. |
| 2015/0337182 A1 | 11/2015 | Spyrou et al. |
| 2015/0376327 A1 | 12/2015 | Ortelt et al. |
| 2017/0166687 A1 | 6/2017 | Ortelt et al. |
| 2017/0166688 A1 | 6/2017 | Ortelt et al. |

FOREIGN PATENT DOCUMENTS

| | | |
|---|---|---|
| CA | 2145589 A1 | 9/1995 |
| CN | 102092999 A1 | 6/2011 |
| EP | 306451 A2 | 3/1989 |
| EP | 669353 A1 | 8/1995 |
| EP | 675185 A2 | 10/1995 |
| FR | 2587024 A1 | 3/1987 |
| GB | 1386495 | 3/1975 |
| WO | 2016177533 A1 | 11/2016 |

OTHER PUBLICATIONS

Langkabel et al., U.S. Appl. No. 15/602,723, filed May 23, 2017.
(Continued)

*Primary Examiner* — Edward J Cain
(74) *Attorney, Agent, or Firm* — Nexsen Pruet, PLLC; Philip P. McCann

(57) ABSTRACT

The present invention is directed to a reinforced building block made of autoclaved aerated concrete (AAC) comprising rebars formed essentially from A) at least one fibrous carrier and B) and a hardened composition formed from B1) at least one epoxy compound and B2) at least one diamine and/or polyamine in a stoichiometric ratio of the epoxy compound B1) to the diamine and/or polyamine component B2) of 0.8:1 to 2:1, as matrix material, and C) optionally further auxiliaries and additives and to methods of production thereof.

20 Claims, No Drawings

(56) References Cited

OTHER PUBLICATIONS

Langkabel et al., U.S. Appl. No. 15/603,966, filed May 24, 2017.
Langkabel et al., U.S. Appl. No. 15/604,118, filed May 24, 2017.
Rüfer et al., U.S. Appl. No. 15/604,873, filed May 25, 2017.
Rüfer et al., U.S. Appl. No. 15/604,988, filed May 25, 2017.
Rüfer et al., U.S. Appl. No. 15/605,268, filed May 25, 2017.
European Search Report dated Dec. 2, 2016 in EP 16 17 5866 (1 page).
U.S. Appl. No. 15/375,792, filed Dec. 12, 2016.

US 10,384,977 B2

REINFORCED BUILDING BLOCK MADE OF AUTOCLAVED AERATED CONCRETE (AAC)

This application claims the benefit of European Application No. 16175866.9 filed on Jun. 23, 2016, the disclosure of which is expressly incorporated herein by reference.

BACKGROUND

Autoclaved aerated concrete (AAC) or autoclaved cellular concrete (ACC), can be used for the production of building blocks made with fine aggregates, cement, and an expansion agent that causes the fresh mixture to rise like bread dough. Typically, in the factory, the material is molded and cut into precisely dimensioned units. The cured blocks or panels of autoclaved aerated concrete obtained thereafter can be joined with thin bed mortar.

Further information and definitions of Autoclaved aerated concrete (AAC) or autoclaved cellular concrete (ACC) are available for example by the European Autoclaved Aerated Concrete Association (EAACA)

Due to the chemical nature of the anhydride-based epoxy binder used according to the state of the art, up to now, the Reinforced Building blocks made of Autoclaved aerated concrete were not resistant to alkali and high operating temperatures. Concrete curing during the first 28 days is performed in a highly alkaline reaction medium with exothermic effect (up to 60° C.) which is a deleterious medium for physical-mechanical properties of composite material based on isomethyltetraphthalic anhydride (IMTGPA).

SUMMARY

Surprisingly, it was now found that composite rebars based on the hardener B) are much more stable to alkaline. Reinforced Building blocks made of Autoclaved aerated concrete (AAC) and rebars based on fibrous carriers and hardeners B) possess superior physical and mechanical properties compared with the state of the art. Furthermore, composite rebars based on hardeners B) can be exposed to higher temperatures the state of the art rebars and can therefore be used in building blocks in order to provide improved heat resistance.

DETAILED DESCRIPTION

The invention provides a Reinforced Building block made of Autoclaved aerated concrete (AAC),
characterized in that
the Reinforced Building block comprises
rebars formed essentially from
A) at least one fibrous carrier
and
B) and a hardened composition formed from
B1) at least one epoxy compound
and
B2) at least one diamine and/or polyamine
  in a stoichiometric ratio of the epoxy compound B1) to the diamine and/or polyamine component B2) of 0.8:1 to 2:1,
  as matrix material,
and
C) optionally further auxiliaries and additives.

The rebar is formed essentially from A) at least one fibrous carrier and B) and a hardened composition. Therefore, when producing the rebar, a fibrous carrier and a hardenable (not yet hardened) composition is used. The hardenable composition used for forming the rebar can optionally comprise further auxiliaries and additives. If further auxiliaries and additives, they are preferably present for reinforcement.

The building blocks of the present invention can be used for various applications and possess positive properties.

The components, i.e. the building blocks of the present invention, can be used for walls, floors, ceiling and roofs.

The lightweight material offers excellent sound and thermal insulation, and like all cement-based materials, is strong and fire resistant.

In order to be durable, AAC requires some type of applied finish, such as a polymer-modified stucco, natural or manufactured stone, or siding.

Detailed Description of the Rebars Employed in the Production of the Inventive Building Blocks.

The rebars are formed essentially from
A) at least one fibrous carrier
and
B) and a hardened composition formed from
B1) at least one epoxy compound
and
B2) at least one diamine and/or polyamine
  in a stoichiometric ratio of the epoxy compound B1) to the diamine and/or polyamine component B2) of 0.8:1 to 2:1,
  as matrix material,
and also
C) optionally further auxiliaries and additives.

The rebar is formed essentially from A) at least one fibrous carrier and B) and a hardened composition. Therefore, when producing the rebar, a fibrous carrier and a hardenable (not yet hardened) composition is used. The hardenable composition used for forming the rebar can optionally comprise further auxiliaries and additives. If further auxiliaries and additives, they are preferably present for reinforcement.

The stoichiometric ratio of the epoxy compounds B1) to the diamine and/or polyamine B2) is 0.8:1 to 2:1, preferably 0.95:1, more preferably 1:1. The stoichiometric ratio is calculated as follows: a stoichiometric reaction means that one oxirane group in the epoxy resin reacts with one active hydrogen atom in the amine. A stoichiometric ratio of epoxy component B1) to amine component B2) of, for example, 0.8:1 means (epoxy equivalent [g/eq]×0.8) to (H-active equivalent of amine [g/eq]×1).

After the application and hardening of the composition B), preferably by thermal treatment, the rebars are non-tacky and can therefore be handled and processed further very efficiently. The compositions B) used in accordance with the invention have very good adhesion and distribution on the fibrous carrier.

The compositions B) used in accordance with the invention are liquid and hence suitable without addition of solvents for the impregnation of fiber material, environmentally friendly and inexpensive, have good mechanical properties, can be processed in a simple manner and feature good weathering resistance after hardening.

According to the invention, the rebars have exceptional chemical resistance, especially to the alkaline medium of concrete.

Fibrous Carrier A)

The fibrous carrier consists of fibrous material, also often called reinforcing fibers. Any material that the fibers consist of is generally suitable, but preference is given to using fibrous material made of glass, carbon, plastics such as polyamide (aramid) or polyester, natural fibers, or mineral fiber materials such as basalt fibers or ceramic fibers (oxidic fibers based on aluminium oxides and/or silicon oxides). It is also possible to use mixtures of fiber types, for example combinations of aramid and glass fibers, or carbon and glass fibers.

Mainly because of their relatively low cost, glass fibers are the most commonly used fiber types. In principle, all types of glass-based reinforcing fibers are suitable here (E glass, S glass, R glass, M glass, C glass, ECR glass, D glass, AR glass, or hollow glass fibers). Carbon fibers are generally used in high-performance composites, where another important factor is the lower density compared to glass fibers with simultaneously high strength. Carbon fibers are industrially produced fibers composed of carbonaceous starting materials which are converted by pyrolysis to carbon in a graphite-like arrangement. A distinction is made between isotropic and anisotropic types: isotropic fibers have only low strengths and lower industrial significance; anisotropic fibers exhibit high strengths and rigidities with simultaneously low elongation at break. Natural fibers refer here to all textile fibers and fibrous materials which are obtained from plant and animal material (for example wood fibers, cellulose fibers, cotton fibers, hemp fibers, jute fibers, flax fibers, sisal fibers and bamboo fibers). Similarly to carbon fibers, aramid fibers exhibit a negative coefficient of thermal expansion, i.e. become shorter on heating. Their specific strength and their modulus of elasticity are markedly lower than those of carbon fibers. In combination with the positive coefficient of expansion of the matrix resin, it is possible to produce components of high dimensional stability. Compared to carbon fiber-reinforced plastics, the compressive strength of aramid fiber composites is much lower. Known brand names for aramid fibers are Nomex® and Kevlar® from DuPont, or Teijinconex®, Twaron® and Technora® from Teijin. Particularly suitable and preferred carriers are those made of glass fibers, carbon fibers, aramid fibers or ceramic fibers. In the context of the invention, all the materials mentioned are suitable as fibrous carriers. An overview of reinforcing fibers is contained in "Composites Technologies", Paolo Ermanni (Version 4), script for lecture at ETH Zürich, August 2007, Chapter 7.

The carrier material used with preference in accordance with the invention is characterized in that the fibrous carriers consist of glass, carbon, plastics (preferably of polyamide (aramid) or polyester), mineral fiber materials such as basalt fibers or ceramic fibers, individually or as mixtures of different fiber types.

Particular preference is given to glass fibers of any geometry, especially round glass fibers, either in the form of solid or hollow rods.

Particular preference is given to solid rods having surface profiling for firm anchoring in the concrete, for example by means of winding threads or the milling of an annular or spiral groove.

The rods may additionally be provided with a surface topcoat.

Matrix Material B)
Epoxy Compounds B1)

Suitable epoxy compounds B1) are described, for example, in EP 675 185.

Useful compounds are a multitude of those known for this purpose that contain more than one epoxy group, preferably two epoxy groups, per molecule. These epoxy compounds may either be saturated or unsaturated and be aliphatic, cycloaliphatic, aromatic or heterocyclic, and also have hydroxyl groups. They may additionally contain such substituents that do not cause any troublesome side reactions under the mixing or reaction conditions, for example alkyl or aryl substituents, ether moieties and the like. They are preferably glycidyl ethers which derive from polyhydric phenols, especially bisphenols and novolacs, and which have molar masses based on the number of epoxy groups ME ("epoxy equivalent weights", "EV value") between 100 and 1500, but especially between 150 and 250, g/eq.

Examples of polyhydric phenols include: resorcinol, hydroquinone, 2,2-bis(4-hydroxyphenyl)propane (bisphenol A), isomer mixtures of dihydroxydiphenylmethane (bisphenol F), 4,4'-dihydroxydiphenylcyclohexane, 4,4'-dihydroxy-3,3'-dimethyldiphenylpropane, 4,4'-dihydroxydiphenyl, 4,4'-dihydroxybenzophenone, bis(4-hydroxyphenyl)-1,1-ethane, bis(4-hydroxyphenyl)-1,1-isobutane, 2,2-bis(4-hydroxy-tert-butylphenyl)propane, bis(2-hydroxynaphthyl)methane, 1,5-dihydroxynaphthalene, tris(4-hydroxyphenyl)methane, bis(4-hydroxyphenyl) ether, bis(4-hydroxyphenyl) sulphone inter alia, and the chlorination and bromination products of the aforementioned compounds, for example tetrabromobisphenol A. Very particular preference is given to using liquid diglycidyl ethers based on bisphenol A and bisphenol F having an epoxy equivalent weight of 150 to 200 g/eq.

It is also possible to use polyglycidyl ethers of polyalcohols, for example ethane-1,2-diol diglycidyl ether, propane-1,2-diol diglycidyl ether, propane-1,3-diol diglycidyl ether, butanediol diglycidyl ether, pentanediol diglycidyl ether (including neopentyl glycol diglycidyl ether), hexanediol diglycidyl ether, diethylene glycol diglycidyl ether, dipropylene glycol diglycidyl ether, higher polyoxyalkylene glycol diglycidyl ethers, for example higher polyoxyethylene glycol diglycidyl ethers and polyoxypropylene glycol diglycidyl ethers, co-polyoxyethylene-propylene glycol diglycidyl ethers, polyoxytetramethylene glycol diglycidyl ether, polyglycidyl ethers of glycerol, of hexane-1,2,6-triol, of trimethylolpropane, of trimethylolethane, of pentaerythritol or of sorbitol, polyglycidyl ethers of oxyalkylated polyols (for example of glycerol, trimethylolpropane, pentaerythritol, inter alia), diglycidyl ethers of cyclohexanedimethanol, of bis(4-hydroxycyclohexyl)methane and of 2,2-bis(4-hydroxycyclohexyl)propane, polyglycidyl ethers of castor oil, triglycidyl tris(2-hydroxyethyl)isocyanurate.

Further useful components B1) include: poly(N-glycidyl) compounds obtainable by dehydrohalogenation of the reaction products of epichlorohydrin and amines such as aniline, n-butylamine, bis(4-aminophenyl)methane, m-xylylenediamine or bis(4-methylaminophenol)methane. The poly(N-glycidyl) compounds also include triglycidyl isocyanurate, triglycidylurazole and oligomers thereof, N,N'-diglycidyl derivatives of cycloalkyleneureas and diglycidyl derivatives of hydantoins inter alia.

In addition, it is also possible to use polyglycidyl esters of polycarboxylic acids which are obtained by the reaction of epichlorohydrin or similar epoxy compounds with an aliphatic, cycloaliphatic or aromatic polycarboxylic acid such as oxalic acid, succinic acid, adipic acid, glutaric acid, phthalic acid, terephthalic acid, tetrahydrophthalic acid, hexahydrophthalic acid, naphthalene-2,6-dicarboxylic acid and higher diglycidyl dicarboxylates, for example dimerized or trimerized linolenic acid. Examples are diglycidyl adipate, diglycidyl phthalate and diglycidyl hexahydrophthalate.

Mention should additionally be made of glycidyl esters of unsaturated carboxylic acids and epoxidized esters of unsaturated alcohols or unsaturated carboxylic acids. In addition to the polyglycidyl ethers, it is possible to use small amounts of monoepoxides, for example methyl glycidyl ether, butyl glycidyl ether, allyl glycidyl ether, ethylhexyl glycidyl ether, long-chain aliphatic glycidyl ethers, for example cetyl glycidyl ether and stearyl glycidyl ether, monoglycidyl ethers of a higher isomeric alcohol mixture, glycidyl ethers of a mixture of C12 to C13 alcohols, phenyl glycidyl ether, cresyl glycidyl ether, p-tert-butylphenyl glycidyl ether, p-octylphenyl glycidyl ether, p-phenylphenyl glycidyl ether, glycidyl ethers of an alkoxylated lauryl alcohol, and also monoepoxides such as epoxidized monounsaturated hydrocarbons (butylene oxide, cyclohexene oxide, styrene oxide), in proportions by mass of up to 30%, preferably 10% to 20%, based on the mass of the polyglycidyl ethers.

A detailed enumeration of the suitable epoxy compounds can be found in the handbook "Epoxidverbindungen and Epoxidharze" [Epoxy Compounds and Epoxy Resins] by A. M. Paquin, Springer Verlag, Berlin 1958, Chapter IV, and in Lee Neville "Handbook of Epoxy Resins", 1967, Chapter 2.

Useful epoxy compounds B1) preferably include glycidyl ethers and glycidyl esters, aliphatic epoxides, diglycidyl ethers based on bisphenol A and/or bisphenol F, and glycidyl methacrylates. Other examples of such epoxides are triglycidyl isocyanurate (TGIC, trade name: ARALDIT 810, Huntsman), mixtures of diglycidyl terephthalate and triglycidyl trimellitate (trade name: ARALDIT PT 910 and 912, Huntsman), glycidyl esters of Versatic acid (trade name: CARDURA E10, Shell), 3,4-epoxycyclohexylmethyl 3',4'-epoxycyclohexanecarboxylate (ECC), ethylhexyl glycidyl ether, butyl glycidyl ether, pentaerythrityl tetraglycidyl ether (trade name: POLYPDX R 16, UPPC AG), and other Polypox products having free epoxy groups.

It is also possible to use mixtures of the epoxy compounds mentioned.

The epoxy component B1) used more preferably comprises polyepoxides based on bisphenol A diglycidyl ether, bisphenol F diglycidyl ether or cycloaliphatic types. Preferably, epoxy resins used in the hardenable composition B) of the invention are selected from the group comprising epoxy resins based on bisphenol A diglycidyl ether, epoxy resins based on bisphenol F diglycidyl ether and cycloaliphatic types, for example 3,4-epoxycyclohexylepoxyethane or 3,4-epoxycyclohexylmethyl 3,4-epoxycyclohexanecarboxylate, particular preference being given to bisphenol A-based epoxy resins and bisphenol F-based epoxy resins.

According to the invention, it is also possible to use mixtures of epoxy compounds as component B1).

Amines B2)

Di- or polyamines B2) are known in the literature. These may be monomeric, oligomeric and/or polymeric compounds.

Monomeric and oligomeric compounds are preferably selected from the group of diamines, triamines, tetramines.

For component B2), preference is given to using primary and/or secondary di- or polyamines, particular preference to using primary di- or polyamines. The amino group of the di- or polyamines B2) may be attached to a primary, secondary or tertiary carbon atom, preferably to a primary or secondary carbon atom.

Components B2) used are preferably the following amines, alone or in mixtures:

aliphatic amines, such as the polyalkylenepolyamines, preferably selected from ethylene-1,2-diamine, propylene-1,2-diamine, propylene-1,3-diamine, butylene-1,2-diamine, butylene-1,3-diamine, butylene-1,4-diamine, 2-(ethylamino)ethylamine, 3-(methylamino)propylamine, diethylenetriamine, triethylenetetramine, pentaethylenehexamine, trimethylhexamethylenediamine, 2,2,4-trimethylhexamethylenediamine, 2,4,4-trimethylhexamethylenediamine, 2-methylpentanediamine, hexamethylenediamine, N-(2-aminoethyl)ethane-1,2-diamine, N-(3-aminopropyl)propane-1,3-diamine, N,N"-1,2-ethanediylbis(1,3-propanediamine), dipropylenetriamine, adipic dihydrazide, hydrazine;

oxyalkylenepolyamines selected from polyoxypropylenediamine and polyoxypropylenetriamine (e.g. Jeffamine® D-230, Jeffamine® D-400, Jeffamine® T-403, Jeffamine® T-5000), 1,13-diamino-4,7,10-trioxatridecane, 4,7-dioxadecane-1,10-diamine;

cycloaliphatic amines selected from isophoronediamine (3,5,5-trimethyl-3-aminomethylcyclohexylamine), 4,4'-diaminodicyclohexylmethane, 2,4'-diaminodicyclohexylmethane and 2,2'-diaminodicyclohexylmethane, alone or in mixtures of the isomers, 3,3'-dimethyl-4,4'-diaminodicyclohexylmethane, N-cyclohexyl-1,3-propanediamine, 1,2-diaminocyclohexane, 3-(cyclohexylamino)propylamine, piperazine, N-aminoethylpiperazine, TCD diamine (3(4),8(9)-bis(aminomethyl)tricyclo[$5.2.1.0^{2,6}$]decane), araliphatic amines such as xylylenediamines;

aromatic amines selected from phenylenediamines, phenylene-1,3-diamine, phenylene-1,4-diamine, 4,4'-diaminodiphenylmethane, 2,4'-diaminodiphenylmethane, 2,2'-diaminodiphenylmethane, alone or in mixtures of the isomers;

adduct hardeners which are the reaction products of epoxy compounds, especially glycidyl ethers of bisphenol A and F, with excess amine;

polyamidoamine hardeners which are obtained by condensation of mono- and polycarboxylic acids with polyamines, especially by condensation of dimer fatty acids with polyalkylenepolyamines;

Mannich base hardeners which are obtained by reaction of mono- or polyhydric phenols with aldehydes, especially formaldehyde, and polyamines;

Mannich bases, for example based on phenol and/or resorcinol, formaldehyde and m-xylylenediamine, and also N-aminoethylpiperazine and blends of N-aminoethylpiperazine with nonylphenol and/or benzyl alcohol, phenalkamines which are obtained in a Mannich reaction from cardanols, aldehydes and amines.

It is also possible to use mixtures of the aforementioned di- or polyamines as component B2).

Preference is given to using diamines as component B2), selected from isophoronediamine (3,5,5-trimethyl-3-aminomethylcyclohexylamine, IPD), 4,4'-diaminodicyclohexylmethane, 2,4'-diaminodicyclohexylmethane, 2,2'-diaminodicyclohexylmethane (also referred to as PACM), alone or in mixtures of the isomers, a mixture of the isomers of 2,2,4-trimethylhexamethylenediamine and 2,4,4-trimethylhexamethylenediamine (TMD), adduct hardeners based on the reaction products of the epoxy compounds and the aforementioned amines or combinations of aforementioned amines. It is also possible to use mixtures of these compounds.

Very particular preference is given to using isophoronediamine (3,5,5-trimethyl-3-(aminomethyl)cyclohexylamine, IPD) and/or a combination of isophoronediamine and a mixture of the isomers of 2,2,4-trimethylhexamethylenediamine and 2,4,4-trimethylhexamethylenediamine (TMD) and/or adduct hardeners based on the reaction product of epoxy compounds and the aforementioned amines or combinations of the aforementioned amines.

In addition to the di- and polyamines B2), it is possible to use the di- and polyamines together with latent hardeners as component B2). The additional latent hardener used may in principle be any compound known for this purpose, i.e. any compound which is inert toward the epoxy resin below the defined limiting temperature of 80DEG C. but reacts rapidly with crosslinking of the resin as soon as this melting temperature has been exceeded. The limiting temperature for the latent hardeners used is preferably at least 85DEG C., especially at least 100DEG C. Compounds of this kind are well known and also commercially available.

Examples of suitable latent hardeners are dicyandiamide, cyanoguanidines, for example the compounds described in U.S. Pat. No. 4,859,761 or EP-A-306 451, aromatic amines, for example 4,4- or 3,3-diaminodiphenyl sulphone, or guanidines, for example 1-o-tolylbiguanide, or modified polyamines, for example Ancamine TM 2014 S (Anchor Chemical UK Limited, Manchester).

Suitable latent hardeners are also N-acylimidazoles, for example 1-(2,4,6-trimethylbenzoyl)-2-phenylimidazole or 1-benzoyl-2-isopropylimidazole. Such compounds are described, for example, in U.S. Pat. No. 4,436,892, U.S. Pat. No. 4,587,311 or JP Patent 743,212.

Further suitable hardeners are metal salt complexes of imidazoles, as described, for example, in U.S. Pat. No. 3,678,007 or U.S. Pat. No. 3,677,978, carboxylic hydrazides, for example adipic dihydrazide, isophthalic dihydrazide or anthranilic hydrazide, triazine derivatives, for example 2-phenyl-4,6-diamino-s-triazine (benzoguanamine) or 2-lauryl-4,6-diamino-s-triazine (lauroguanamine), and melamine and derivatives thereof. The latter compounds are described, for example, in U.S. Pat. No. 3,030,247.

Also described as suitable latent hardeners are cyanoacetyl compounds, for example in U.S. Pat. No. 4,283,520, for example neopentyl glycol bis(cyanoacetate), N-isobutylcyanoacetamide, hexamethylene 1,6-bis(cyanoacetate) or cyclohexane-1,4-dimethanol bis(cyanoacetate).

Suitable latent hardeners are also N-cyanoacylamide compounds, for example N,N-dicyanoadipamide. Such compounds are described, for example, in U.S. Pat. No. 4,529,821, U.S. Pat. No. 4,550,203 and U.S. Pat. No. 4,618,712.

Further suitable latent hardeners are the acylthiopropylphenols described in U.S. Pat. No. 4,694,096 and the urea derivatives disclosed in U.S. Pat. No. 3,386,955, for example toluene-2,4-bis(N,N-dimethylcarbamide).

Preferred latent hardeners are 4,4-diaminodiphenyl sulphone and especially dicyandiamide. The abovementioned latent hardeners may be present in amounts of up to 30% by weight, based on the overall amine composition (component B2).

Auxiliaries and Additives C)

In addition to components A) and B) (carrier material and resin composition), the rebars may also include further additives; these are typically added to the resin composition B). For example, it is possible to add light stabilizers, for example sterically hindered amines, or other auxiliaries as described, for example, in EP 669 353 in a total amount of 0.05% to 5% by weight. Fillers and pigments, for example titanium dioxide or organic dyes, may be added in an amount of up to 30% by weight of the overall composition. For the production of the reactive compositions of the invention, it is additionally possible to add additives such as levelling agents, for example polysilicones, for adhesion promoters, for example those based on acrylate. In addition, still further components may optionally be present. Auxiliaries and additives used in addition may be chain transfer agents, plasticizers, stabilizers and/or inhibitors. In addition, it is possible to add dyes, fillers, wetting, dispersing and levelling aids, adhesion promoters, UV stabilizers, defoamers and rheology additives.

In addition, catalysts for the epoxy-amine reaction may be added. Suitable accelerators are described in: H. Lee and K. Neville, *Handbook of Epoxy Resins*, McGraw-Hill, New York, 1967. Normally, accelerators are used in amounts of not more than 10% and preferably in amounts of 5% or less, based on the total weight of the formulation.

Examples of suitable accelerators are organic acids such as salicylic acid, dihydroxybenzoic acid, trihydroxybenzoic acid, methyl salicylic acid, 2-hydroxy-3-isopropylbenzoic acid or hydroxynaphthoic acids, lactic acid and glycolic acid, tertiary amines such as benzyldimethylamine (BDMA), 1,4-diazabicyclo[2.2.2]octane (DABCO), triethylamine, N,N'-dimethylpiperazine or aminoethylpiperazine (AEP), hydroxylamines such as dimethylaminomethylphenol, bis(dimethylaminomethyl)phenol, 2,4,6-tris(dimethylaminomethyl)phenol (Ancamine K54), urons such as 3-(4-chlorophenyl)-1,1-dimethylurea (monuron), 3-(3,4-dichlorophenyl)-1,1-dimethylurea (diuron), 3-phenyl-1,1-dimethylurea (fenuron), 3-(3-chloro-4-methylphenyl)-1,1-dimethylurea (chlortoluron), tetraalkylguanidines such as N,N,N',N'-tetramethylguanidine (TMG), imidazole and imidazole derivatives such as 1H-imidazole, 1-methylimidazole, 2-methylimidazole, 1-benzyl-2-methylimidazole, 2-ethyl-4-methylimidazole, 2-phenylimidazole, 2-phenyl-4-methylimidazole, 1-vinylimidazole, 1-(2-hydroxyethyl)imidazole, 1,2-dimethylimidazole, 1-cyanoethylimidazole and the suitable salts thereof, phenol and phenol derivatives such as t-butylphenol, nonylphenol, bisphenol A or bisphenol F, and organic or inorganic salts and complexes such as methyltriphenylphosphonium bromide, calcium nitrate (Accelerator 3130), or carboxylates, sulphonates, phosphonates, sulphates, tetrafluoroborates or nitrates of Mg, Ca, Zn and Sn.

The invention also provides a method of producing building blocks according to the present invention, wherein
at least one rebar formed essentially from
A) at least one fibrous carrier
and
B) and a hardened composition formed from
B1) at least one epoxy compound
and
B2) at least one diamine and/or polyamine
   in a stoichiometric ratio of the epoxy compound B1) to the diamine and/or polyamine component B2) of 0.8:1 to 2:1,
   as matrix material,
and
C) optionally further auxiliaries and additives,
is positioned in a mold, aerated concrete mortar is added and the content of the mold is cured.

In the inventive production method, the at least one rebar can be joined (fastened together) with other rebars (if present) in order to form a reinforcing grid. Preferably, the inventive production method employs a plurality of rebars that are joined together, e.g. with plastic clamps, to form a reinforcing grid before the mortar is added to the mold, in order to produce building blocks of enhanced mechanical stability. The mold can be made of various material. Preferably, the mold is made of steel. Aerated concrete compositions are known to the person skilled in the art, as well as curing conditions thereof.

Application, Hardening, Temperatures, Methods, Variants

The inventive rebars composed of fiber-reinforced polymers can preferably be produced by a pultrusion method. Pultrusion is a continuous production method for fiber-reinforced thermosets. The products are conventionally continuous profiles of uniform cross section. This involves conducting reinforcing materials, such as typically rovings, or else cut mats, continuous mats, scrims and nonwovens, alone or in combination, through a resin bath, stripping off excess resin, preforming the structure by means of appropriate slots and then pulling the impregnated fibers through a heated mould with an appropriate profile cross section or alternatively in a free-floating manner through a hardening apparatus, and hardening them. In summary, a pultrusion system consists of the following components:
- an unwinding station for the reinforcing fibers
- the impregnation device
- the preforming and feeding unit
- the mould (A) or the hardening device (B)
- the pulling station
- the finishing The unwinding station consists of a creel for rovings and/or appropriate unwinding stations for two-dimensional reinforcing materials. The impregnation device may be an open resin bath or a closed multicomponent impregnating unit. The impregnation device may be heatable and/or designed with a circulation unit. After the fibers have been impregnated with the resin system, the impregnated reinforcing materials are conducted through apertures, in the course of which excess resin is stripped off and hence the target fiber volume content is established. The shape of the slots also continuously generates the preform of near net shape. The impregnated fiber preform thus defined then enters the heated mould. The pulling through the mould (A) causes the pultruded profile to receive its final dimensions and shape. During this shaping process, the component hardens. The heating is effected electrically or by means of thermal oil. Preferably, the mould is equipped with a plurality of independently controllable heating segments. Tools for pultrusion are usually between 75 cm and 1.50 m in length and may be one-piece or two-piece. The pulling station continuously pulls the reinforcing materials from the respective unwinding station, the reinforcing fibers through the impregnation unit, the impregnated fiber materials through the aperture and the continuously produced preform through the shaping mould, where the resin system then hardens and from which the finished profile exits at the end. The last element in the process chain is a processing station for surface configuration (e.g. mill), followed by a sawing station, where the pultruded profiles are then cut to the desired measurement.

Alternatively and preferably, the surface configuration of the rebars may follow the impregnation step and the stripping-off of excess resin and precede the entry of the fiber/matrix structure into a hardening apparatus (B). In this case, the impregnated combined fiber strand after the resin stripping is provided with winding threads wound around in a crosswise or spiral manner. In some cases, the surface is treated with sand. The hardening apparatus in this case is an oven in which the continuously produced resin-impregnated fiber structure is hardened in a free-floating manner. The heating of the hardening apparatus or the introduction of heat into the material can be accomplished by means of hot air, IR radiation or microwave heating. Such a hardening apparatus typically has a length of 2 to 10 m, with independently controllable heating segments. The hardening is effected at temperatures between 100 and 300° C.; typical advance rates are 0.5 to 5 m/min.

At the end of the overall shaping process (hardening of the bars with surface configuration), a surface coating step may optionally also be effected.

EXAMPLES

Manufacture of Reinforced Building block made of Autoclaved aerated concrete (AAC)
Stage 1: "Temperature Factor Effect on Composite Rebar Properties"
A hardened composition was formed from
B1) an epoxy compound based on bisphenol A diglycidyl ether
and
B2)
  1. Comparative Example:
     Methyltetrahydrophtalic anhydride with 2,6-Bis(1,1-dimethylethyl)-4-methylphenol) as a catalyst and 2,2'-oxybisethanol; 3-oxa-1,5-pentanediol as a plasticizer
  2. Invention:
     A mixture of 98 parts by weight of isophoronediamine and a mixture of 2 parts by weight of the isomers of 2,2,4-trimethylhexamethylenediamine and 2,4,4-trimethylhexamethylenediamine (TMD),
in a stoichiometric ratio of the epoxy compound B1) to the component B2) of 1,0:1,1, on glass fibers
which were put into a muffle furnace for 12 hours at 210° C. Visual inspection was performed upon completion of the experiment. No visible damages were discovered, rebar properties were preserved (for all samples).
Stage 2: "Autoclaved Aerated Concrete Reinforcement with Composite Rebars"

Glass composite 5 mm rebar sections as formed according to stage 1 and accordingly formed basalt composites were fastened together with plastic clamps in a form of reinforcing grids and were put into metal molds (dimensions—100× 100×100) which were then filled with aerated concrete mortar with a design density of D500.

Upon setting and strength gain, samples were removed from molds and were exposed to autoclave treatment in an industrial autoclave at the temperature of 190° C. and at the pressure of 1.24 MPa according to the following regime:
40 minutes—vacuum processing;
3 hours—pressure build-up;
6 hours—pressure maintenance;
2 hours—pressure discharge.

Upon completion of autoclaving, samples were removed from the autoclave and were inspected for compression strength, moisture content and density.

Conclusions what was found as an advantage of the invention:

Comparative Examples (Glass Composite and Basalt Composite)

Exposure to temperatures above 100° C. and influence of aqueous vapor and alkaline environment leads to destruction of the coatings and composite rebars.

Inventive Examples (Glass Composite and Basalt Composite)

Examples according to the inventive combination of isophoronediamine and a mixture of the isomers of 2,2,4- trimethylhexamethylenediamine and 2,4,4-trimethylhexamethylenediamine (TMD) on both fibers tolerate working temperature very well up to 190° C. Therefore, the temperature range can be xtended by application of coatings with improved heat-resistant properties which is presented by the amine hardener based on the combination of isophoronediamine and a mixture of the isomers of 2,2,4-trimethylhexamethylenediamine and 2,4,4-trimethylhexamethylenediamine (TMD) (product Vestamin® R 215 manufactured by Evonik).

The invention claimed is:

1. A reinforced Building block made of Autoclaved aerated concrete (AAC),
wherein
the Reinforced Building block comprises
rebars formed essentially from
A) at least one fibrous carrier
and
B) and a hardened composition formed from
B1) at least one epoxy compound
and
B2) at least one diamine and/or polyamine
in a stoichiometric ratio of the epoxy compound B1) to the diamine and/or polyamine component B2) of 0.8:1 to 2:1,
as matrix material,
and
C) optionally further auxiliaries and additives.

2. The building block according to claim 1, wherein the fibrous carrier is selected from the group consisting of glass, carbon, polymers, natural fibers, mineral fiber materials and ceramic fibers.

3. The building block according to claim 1, wherein the epoxy compound B1) is selected from the group consisting of saturated, unsaturated, aliphatic, cycloaliphatic, aromatic and heterocyclic epoxy compounds with or without hydroxyl groups.

4. The building block according to claim 1, wherein the epoxy compound B1) is selected from the group consisting of glycidyl ethers, glycidyl esters, aliphatic epoxides, diglycidyl ethers based on bisphenol A and/or bisphenol F, and glycidyl methacrylates.

5. The building block according to claim 1, wherein the epoxy compound B1) is selected from the group consisting of epoxy resins based on bisphenol A diglycidyl ether, epoxy resins based on bisphenol F diglycidyl ether and cycloaliphatic epoxy resins.

6. The building block according to claim 1, wherein the diamine and/or polyamine B2) is selected from the group consisting of primary and/or secondary di- and/or polyamines.

7. The building block according to claim 1, wherein the diamine and/or polyamine B2) is selected from the following amines, alone or in mixture:
aliphatic amines, preferably polyalkylenepolyamines, more preferably selected from ethylene-1,2-diamine, propylene-1,2-diamine, propylene-1,3-diamine, butylene-1,2-diamine, butylene-1,3-diamine, butylene-1,4-diamine, 2-(ethylamino)ethylamine, 3-(methylamino)propylamine, diethylenetriamine, triethylenetetramine, pentaethylenehexamine, trimethylhexamethylenediamine, 2,2,4-trimethylhexamethylenediamine, 2,4,4-trimethylhexamethylenediamine, 2-methylpentanediamine, hexamethylenediamine, N-(2-aminoethyl) ethane-1,2-diamine, N-(3-aminopropyl)propane-1,3-diamine, N,N''-1,2-ethanediylbis(1,3-propanediamine), dipropylenetriamine, adipic dihydrazide, hydrazine;
oxyalkylenepolyamines selected from polyoxypropylenediamine and polyoxypropylenetriamine;
cycloaliphatic amines selected from isophoronediamine (3,5,5-trimethyl-3-aminomethylcyclohexylamine), 4,4'-diaminodicyclohexylmethane, 2,4'-diaminodicyclohexylmethane and 2,2'-diaminodicyclohexylmethane, alone or in mixtures of the isomers, 3,3'-dimethyl-4,4'-diaminodicyclohexylmethane, N-cyclohexyl-1,3-propanediamine, 1,2-diaminocyclohexane, 3-(cyclohexylamino)propylamine, piperazine, N-aminoethylpiperazine, TCD diamine (3(4),8(9)-bis(aminomethyl)tricyclo[$5.2.1.0^{2,6}$]decane),
araliphatic amines;
aromatic amines selected from phenylenediamines, phenylene-1,3-diamine, phenylene-1,4-diamine, 4,4'-diaminodiphenylmethane, 2,4'-diaminodiphenylmethane, 2,2'-diaminodiphenylmethane, alone or in mixtures of the isomers;
adduct hardeners which are the reaction products of epoxy compounds, especially glycidyl ethers of bisphenol A and F, with excess amine;
polyamidoamine hardeners which are obtained by condensation of mono- and polycarboxylic acids with polyamines, especially by condensation of dimer fatty acids with polyalkylenepolyamines;
Mannich base hardeners which are obtained by reaction of mono- or polyhydric phenols with aldehydes, especially formaldehyde, and polyamines;
Mannich bases, formaldehyde, m-xylylenediamine, N-aminoethylpiperazine, blends of N-aminoethylpiperazine with nonylphenol and/or benzyl alcohol, phenalkamines which are obtained in a Mannich reaction from cardanols, aldehydes and amines.

8. The building block according to claim 1, wherein the diamine and/or polyamine B2) is selected from the group consisting of isophoronediamine, 4,4'-diaminodicyclohexylmethane, 2,4'-diaminodicyclohexylmethane, 2,2'-diaminodicyclohexylmethane, alone or in mixtures of the isomers, a mixture of the isomers of 2,2,4-trimethylhexamethylenediamine and 2,4,4-trimethylhexamethylenediamine, adduct hardeners based on the reaction product of epoxy compounds and diamines and/or polyamines B2) or a combination of the aforementioned amines.

9. The building block according to claim 1, wherein the diamine and/or polyamine B2) is selected from the group consisting of isophoronediamine and/or a combination of isophoronediamine and a mixture of the isomers of 2,2,4-trimethylhexamethylenediamine and 2,4,4-trimethylhexamethylenediamine.

10. The building block according to claim 1, wherein mixtures of the di- and/or polyamines with at least one latent hardener are used as component B2).

11. The building block according to claim 10, wherein the at least one latent hardener is selected from dicyandiamide, cyanoguanidines, aromatic amines, guanidines, modified polyamines, N-acylimidazoles, imidazoles, carbonyl hydrazides, triazine derivatives, melamine and derivatives thereof, N-cyanoacylamide compounds, and acylthiopropylphenols.

12. A method of producing building blocks according to claim 1, wherein at least one rebar formed essentially from
A) at least one fibrous carrier
and
B) a hardened composition formed from
B1) at least one epoxy compound
and B2) at least one diamine and/or polyamine
in a stoichiometric ratio of the epoxy compound B1) to the diamine and/or polyamine component B2) of 0.8:1 to 2:1, as matrix material, and
C) optionally further auxiliaries and additives,
is positioned in a mold, aerated concrete mortar is added and the content of the mold is cured.

13. The building block according to claim 2, wherein the epoxy compound B1) is selected from the group consisting of saturated, unsaturated, aliphatic, cycloaliphatic, aromatic and heterocyclic epoxy compounds with or without hydroxyl groups.

14. The building block according to claim 2, wherein the epoxy compound B1) is selected from the group consisting of glycidyl ethers, glycidyl esters, aliphatic epoxides, diglycidyl ethers based on bisphenol A and/or bisphenol F, and glycidyl methacrylates.

15. The building block according to claim 2, wherein the epoxy compound B1) is selected from the group consisting of epoxy resins based on bisphenol A diglycidyl ether, epoxy resins based on bisphenol F diglycidyl ether and cycloaliphatic epoxy resins.

16. The building block according to claim 2, wherein the diamine and/or polyamine B2) is selected from the group consisting of primary and/or secondary di- and/or polyamines.

17. The building block according to claim 2, wherein the diamine and/or polyamine B2) is selected from the following amines, alone or in mixture:
aliphatic amines, preferably polyalkylenepolyamines, more preferably selected from ethylene-1,2-diamine, propylene-1,2-diamine, propylene-1,3-diamine, butylene-1,2-diamine, butylene-1,3-diamine, butylene-1,4-diamine, 2-(ethylamino)ethylamine, 3-(methylamino)propylamine, diethylenetriamine, triethylenetetramine, pentaethylenehexamine, trimethylhexamethylenediamine, 2,2,4-trimethylhexamethylenediamine, 2,4,4-trimethylhexamethylenediamine, 2-methylpentanediamine, hexamethylenediamine, N-(2-aminoethyl)ethane-1,2-diamine, N-(3-aminopropyl)propane-1,3-diamine, N,N''-1,2-ethanediylbis(1,3-propanediamine), dipropylenetriamine, adipic dihydrazide, hydrazine;
oxyalkylenepolyamines selected from polyoxypropylenediamine and polyoxypropylenetriamine;
cycloaliphatic amines selected from isophoronediamine (3,5,5-trimethyl-3-aminomethylcyclohexylamine), 4,4'-diaminodicyclohexylmethane, 2,4'-diaminodicyclohexylmethane and 2,2'-diaminodicyclohexylmethane, alone or in mixtures of the isomers, 3,3'-dimethyl-4,4'-diaminodicyclohexylmethane, N-cyclohexyl-1,3-propanediamine, 1,2-diaminocyclohexane, 3-(cyclohexylamino)propylamine, piperazine, N-aminoethylpiperazine, TCD diamine (3(4),8(9)-bis(aminomethyl)tricyclo[5.2.1.0$^{2,6}$]decane),
araliphatic amines;
aromatic amines selected from phenylenediamines, phenylene-1,3-diamine, phenylene-1,4-diamine, 4,4'-diaminodiphenylmethane, 2,4'-diaminodiphenylmethane, 2,2'-diaminodiphenylmethane, alone or in mixtures of the isomers;
adduct hardeners which are the reaction products of epoxy compounds, especially glycidyl ethers of bisphenol A and F, with excess amine;
polyamidoamine hardeners which are obtained by condensation of mono- and polycarboxylic acids with polyamines, especially by condensation of dimer fatty acids with polyalkylenepolyamines;
Mannich base hardeners which are obtained by reaction of mono- or polyhydric phenols with aldehydes, especially formaldehyde, and polyamines;
Mannich bases, formaldehyde, m-xylylenediamine, N-aminoethylpiperazine, blends of N-aminoethylpiperazine with nonylphenol and/or benzyl alcohol, phenalkamines which are obtained in a Mannich reaction from cardanols, aldehydes and amines.

18. The building block according to claim 2, wherein the diamine and/or polyamine B2) is selected from the group consisting of isophoronediamine, 4,4'-diaminodicyclohexylmethane, 2,4'-diaminodicyclohexylmethane, 2,2'-diaminodicyclohexylmethane, alone or in mixtures of the isomers, a mixture of the isomers of 2,2,4-trimethylhexamethylenediamine and 2,4,4-trimethylhexamethylenediamine, adduct hardeners based on the reaction product of epoxy compounds and diamines and/or polyamines B2) or a combination of the aforementioned amines.

19. The building block according to claim 2, wherein the diamine and/or polyamine B2) is selected from the group consisting of isophoronediamine and/or a combination of isophoronediamine and a mixture of the isomers of 2,2,4-trimethylhexamethylenediamine and 2,4,4-trimethylhexamethylenediamine.

20. The building block according to claim 2, wherein mixtures of the di- and/or polyamines with at least one latent hardener are used as component B2).

* * * * *